(12) United States Patent
Lee

(10) Patent No.: US 9,541,733 B2
(45) Date of Patent: Jan. 10, 2017

(54) IMAGING LENS ASSEMBLY

(71) Applicant: ABILITY OPTO-ELECTRONICS TECHNOLOGY CO., LTD., Taichung (TW)

(72) Inventor: Hung-Wen Lee, Taichung (TW)

(73) Assignee: Ability Opto-Electronics Technology Co., Ltd., Taichung (TW)

( * ) Notice: Subject to any disclaimer, the term of this patent is extended or adjusted under 35 U.S.C. 154(b) by 0 days.

(21) Appl. No.: 14/858,521

(22) Filed: Sep. 18, 2015

(65) Prior Publication Data
US 2016/0085051 A1    Mar. 24, 2016

(30) Foreign Application Priority Data
Sep. 24, 2014    (TW) .............................. 103133037 A

(51) Int. Cl.
| | |
|---|---|
| G02B 3/02 | (2006.01) |
| G02B 13/18 | (2006.01) |
| G02B 9/12 | (2006.01) |
| G02B 9/14 | (2006.01) |
| G02B 13/00 | (2006.01) |
| G02B 1/04 | (2006.01) |
| G02B 27/00 | (2006.01) |

(52) U.S. Cl.
CPC ........... *G02B 13/0035* (2013.01); *G02B 1/041* (2013.01); *G02B 9/12* (2013.01); *G02B 9/14* (2013.01); *G02B 27/0025* (2013.01)

(58) Field of Classification Search
CPC ......... G02B 13/0035; G02B 9/12; G02B 9/14; G02B 9/16
USPC ................................ 359/716, 753, 784, 785
See application file for complete search history.

(56) References Cited

U.S. PATENT DOCUMENTS

2007/0229987 A1*  10/2007  Shinohara ................ G02B 9/12
                                                          359/784

* cited by examiner

*Primary Examiner* — William Choi
(74) *Attorney, Agent, or Firm* — McNees Wallace & Nurick LLC

(57) ABSTRACT

An imaging lens assembly includes an optical lens set including first, second and third optical lens elements that are arranged sequentially from an object side to an image side along an optical axis of the imaging lens assembly and that respectively have positive, negative and positive refractive powers, and a fixed aperture stop that is disposed between the object side and the first optical lens element. At least one of the object-side surface and the image-side surface of the second optical lens element is aspheric, and at least one of the object-side surface and the image-side surface of the second and third optical lens element has an inflection point.

11 Claims, 21 Drawing Sheets

| | Radius of Curvature (Radius) | Thickness (Thickness) | Refractive Index (Nd) | Abbe Number (Vd) | Effective Focal Distance fn |
|---|---|---|---|---|---|
| Fixed Aperture Stop | ∞ | -0.078 | | | |
| First Optical Lens Element — Object-Side Surface | 0.796 | 0.211 | 1.515 | 57.2 | 2.278 |
| First Optical Lens Element — Image-Side Surface | 2.236 | 0.292 | | | |
| Second Optical Lens Element — Object-Side Surface | -4.456 | 0.458 | 1.535 | 55.6 | -66.956 |
| Second Optical Lens Element — Image-Side Surface | -5.270 | 0.170 | | | |
| Third Optical Lens Element — Object-Side Surface | 0.686 | 0.474 | 1.583 | 30.0 | 7.239 |
| Third Optical Lens Element — Image-Side Surface | 0.608 | 0.175 | | | |
| Filter — Object-Side Surface | ∞ | 0.21 | 1.517 | 64.17 | |
| Filter — Image-Side Surface | ∞ | 0.290 | | | |

FIG.3

| Surface | Object-Side Surface of first optical lens element | Image-Side Surface of first optical lens element | Object-Side Surface of second optical lens element | Image-Side Surface of second optical lens element | Object-Side Surface of third optical lens element | Image-Side Surface of third optical lens element |
|---|---|---|---|---|---|---|
| k | -0.3786 | 12.4594 | -436.0601 | -3703.8677 | -16.5472 | -0.7662 |
| A | 0.2114 | 0.3748 | -3.2626 | -7.4906 | -0.9019 | -2.7370 |
| B | 2.6842 | -0.3830 | 77.3320 | 92.4616 | -8.8226 | 6.7143 |
| C | -5.7205 | 22.0229 | -1466.4963 | -1047.5235 | 34.3605 | -16.2641 |
| D | 30.0049 | -5.1999 | 1.7473E+4 | 8333.6747 | -21.2055 | 31.0046 |
| E | 60.6064 | 35.7571 | -1.3380E+5 | -4.4310E+4 | -187.3325 | -42.8516 |
| F | -133.6932 | 139.6019 | 6.5553E+5 | 1.5348E+5 | 487.4960 | 40.0532 |
| G | -373.3157 | -445.8491 | -1.9769E+6 | -3.3178E+5 | -370.7184 | -23.7731 |
| H | -299.3570 | 688.1274 | 3.3465E+6 | 4.0606E+5 | 0.0000 | 8.0586 |
| J | 3220.7633 | -1523.6913 | -2.4418E+6 | -2.1424E+5 | 0.0000 | -1.1896 |

FIG.4

|  |  | Radius of Curvature (Radius) | Thickness (Thickness) | Refractive Index (Nd) | Abbe Number (Vd) | Effective Focal Distance fn |
|---|---|---|---|---|---|---|
| Fixed Aperture Stop | | ∞ | −0.139 | | | |
| First Optical Lens Element | Object-Side Surface | 1.184 | 0.324 | 1.515 | 57.2 | 3.290 |
| | Image-Side Surface | 3.545 | 0.419 | | | |
| Second Optical Lens Element | Object-Side Surface | −6.111 | 0.722 | 1.535 | 55.6 | −40.100 |
| | Image-Side Surface | −8.889 | 0.198 | | | |
| Third Optical Lens Element | Object-Side Surface | 1.075 | 0.733 | 1.583 | 30.0 | 9.587 |
| | Image-Side Surface | 0.993 | 0.226 | | | |
| Filter | Object-Side Surface | ∞ | 0.21 | 1.517 | 64.17 | |
| | Image-Side Surface | ∞ | 0.520 | | | |

FIG.7

| Surface | Object-Side Surface of first optical lens element | Image-Side Surface of first optical lens element | Object-Side Surface of second optical lens element | Image-Side Surface of second optical lens element | Object-Side Surface of third optical lens element | Image-Side Surface of third optical lens element |
|---|---|---|---|---|---|---|
| k | -0.4236 | 18.9298 | -436.0601 | -3703.8677 | -16.5472 | -0.7629 |
| A | 0.0700 | 0.0717 | -0.9003 | -2.0908 | -0.3609 | -0.6395 |
| B | 0.2648 | 0.0945 | 9.5150 | 9.9207 | -1.2440 | 0.4821 |
| C | -0.2178 | 0.4120 | -82.8976 | -47.6950 | 2.3524 | -0.3256 |
| D | 0.9046 | 1.3399 | 458.2239 | 167.5220 | -0.6624 | 0.1824 |
| E | 0.8763 | 0.5170 | -1633.2806 | -395.5398 | -2.7086 | -0.0896 |
| F | -0.8948 | 0.9343 | 3734.2385 | 607.9506 | 3.2627 | 0.0352 |
| G | -1.1565 | -1.3812 | -5256.0791 | -582.0753 | -1.1485 | -0.0096 |
| H | -0.4293 | 0.9868 | 4143.7544 | 315.1947 | 0.0000 | 0.0015 |
| J | 2.1379 | -1.0114 | -1402.1415 | -73.4717 | 0.0000 | -0.0001 |

FIG.8

|  | | Radius of Curvature (Radius) | Thickness (Thickness) | Refractive Index (Nd) | Abbe Number (Vd) | Effective Focal Distance fn |
|---|---|---|---|---|---|---|
| Fixed Aperture Stop | | ∞ | -0.159 | | | |
| First Optical Lens Element | Object-Side Surface | 1.244 | 0.341 | 1.515 | 57.2 | 3.319 |
| | Image-Side Surface | 4.114 | 0.427 | | | |
| Second Optical Lens Element | Object-Side Surface | -6.189 | 0.661 | 1.535 | 55.6 | -40.100 |
| | Image-Side Surface | -9.014 | 0.229 | | | |
| Third Optical Lens Element | Object-Side Surface | 1.189 | 0.788 | 1.643 | 22.4 | 9.292 |
| | Image-Side Surface | 1.095 | 0.217 | | | |
| Filter | Object-Side Surface | ∞ | 0.21 | 1.517 | 64.17 | |
| | Image-Side Surface | ∞ | 0.520 | | | |

FIG.11

| Surface | Object-Side Surface of first optical lens element | Image-Side Surface of first optical lens element | Object-Side Surface of second optical lens element | Image-Side Surface of second optical lens element | Object-Side Surface of third optical lens element | Image-Side Surface of third optical lens element |
|---|---|---|---|---|---|---|
| k | -0.6147 | 12.8604 | -436.0601 | -3703.8677 | -16.5472 | -0.6833 |
| A | 0.0537 | 0.0840 | -1.0417 | -1.8820 | -0.2928 | -0.5397 |
| B | 0.2278 | -0.0496 | 10.9281 | 8.4160 | -0.8643 | 0.3333 |
| C | -0.2897 | 0.5636 | -90.6974 | -39.2840 | 1.4346 | -0.1335 |
| D | 0.6879 | 0.6079 | 473.9839 | 135.8731 | -0.2785 | -0.0162 |
| E | 0.7657 | 0.4569 | -1587.8651 | -319.2639 | -1.5483 | 0.0533 |
| F | -0.7732 | 0.8074 | 3394.7759 | 491.4364 | 1.7067 | -0.0311 |
| G | -0.9772 | -1.1670 | -4454.6234 | -472.4216 | -0.5775 | 0.0091 |
| H | -0.3547 | 0.8152 | 3268.6343 | 256.8928 | 0.0000 | -0.0014 |
| J | 1.7270 | -0.8170 | -1028.4962 | -60.0236 | 0.0000 | 8.4167E-5 |

FIG.12

| | Radius of Curvature (Radius) | Thickness (Thickness) | Refractive Index (Nd) | Abbe Number (Vd) | Effective Focal Distance fn |
|---|---|---|---|---|---|
| Fixed Aperture Stop | ∞ | -0.164 | | | |
| First Optical Lens Element | Object-Side Surface | 1.062 | 0.336 | 1.515 | 57.2 | 2.917 |
| | Image-Side Surface | 3.208 | 0.317 | | | |
| Second Optical Lens Element | Object-Side Surface | -5.012 | 0.894 | 1.544 | 56.1 | -72.118 |
| | Image-Side Surface | -6.105 | 0.201 | | | |
| Third Optical Lens Element | Object-Side Surface | 1.105 | 0.709 | 1.643 | 22.4 | 13.518 |
| | Image-Side Surface | 0.946 | 0.226 | | | |
| Filter | Object-Side Surface | ∞ | 0.21 | 1.517 | 64.17 | |
| | Image-Side Surface | ∞ | 0.452 | | | |

FIG.15

| Surface | Object-Side Surface of first optical lens element | Image-Side Surface of first optical lens element | Object-Side Surface of second optical lens element | Image-Side Surface of second optical lens element | Object-Side Surface of third optical lens element | Image-Side Surface of third optical lens element |
|---|---|---|---|---|---|---|
| k | 0.3556 | -34.7725 | -436.0601 | -1000.000 | -16.5219 | -1.3095 |
| A | -0.8310 | 0.8947 | -0.9139 | -2.0595 | -0.4021 | -0.6668 |
| B | 26.5984 | -18.4729 | 8.9275 | 8.9520 | -1.1237 | 0.6565 |
| C | -433.0642 | 306.3479 | -85.9230 | -38.7429 | 2.6582 | -0.4854 |
| D | 4207.0566 | -3078.4992 | 528.6617 | 123.7996 | -2.4684 | 0.2484 |
| E | -2.5335E+4 | 1.9716E+4 | -2107.5418 | -269.5824 | 0.4830 | -0.0863 |
| F | 9.5415E+4 | -8.0503E+4 | 5366.4402 | 385.5398 | 0.7687 | 0.0203 |
| G | -2.1816E+5 | 2.0285E+5 | -8400.3552 | -345.0324 | -0.4082 | -0.0033 |
| H | 2.7642E+5 | -2.8679E+5 | 7451.6123 | 174.6855 | 0.0000 | 0.0004 |
| J | -1.4858E+5 | 1.7377E+5 | -2924.7513 | -37.9400 | 0.0000 | -2.6677E-5 |

FIG.16

|  | Radius of Curvature (Radius) | Thickness (Thickness) | Refractive Index (Nd) | Abbe Number (Vd) | Effective Focal Distance fn |
|---|---|---|---|---|---|
| Fixed Aperture Stop | ∞ | -0.129 | | | |
| First Optical Lens Element — Object-Side Surface | 1.357 | 0.331 | 1.515 | 57.2 | 3.558 |
| First Optical Lens Element — Image-Side Surface | 4.762 | 0.643 | | | |
| Second Optical Lens Element — Object-Side Surface | -4.592 | 0.538 | 1.535 | 55.6 | -78545.1 |
| Second Optical Lens Element — Image-Side Surface | -4.781 | 0.293 | | | |
| Third Optical Lens Element — Object-Side Surface | 1.353 | 0.792 | 1.634 | 23.9 | 22.994 |
| Third Optical Lens Element — Image-Side Surface | 1.150 | 0.243 | | | |
| Filter — Object-Side Surface | ∞ | 0.21 | 1.517 | 64.17 | |
| Filter — Image-Side Surface | ∞ | 0.52 | | | |

FIG.19

| Surface | Object-Side Surface of first optical lens element | Image-Side Surface of first optical lens element | Object-Side Surface of second optical lens element | Image-Side Surface of second optical lens element | Object-Side Surface of third optical lens element | Image-Side Surface of third optical lens element |
|---|---|---|---|---|---|---|
| k | -0.5868 | 12.0263 | -58.5899 | -247.9706 | -0.8731 | -0.6895 |
| A | 0.0617 | 0.0676 | -0.2472 | -0.9303 | -0.6927 | -0.4234 |
| B | 0.0990 | 0.0658 | 0.2170 | 1.3284 | 0.2782 | 0.2230 |
| C | 0.0372 | 0.3013 | -0.5037 | -1.4406 | -0.0630 | -0.0960 |
| D | 0.0233 | -0.1077 | 0.1022 | 0.6132 | -0.0698 | 0.0212 |
| E | 1.0227 | 0.6214 | 1.2222 | 0.2058 | 0.0675 | -0.0001 |
| F | -0.8948 | 0.9343 | -0.3224 | 0.0102 | 0.0145 | -0.0009 |
| G | -1.1565 | -1.3812 | -0.9362 | -0.1005 | -0.0260 | 2.6984E-6 |
| H | -0.4293 | 0.9868 | 0.8353 | -0.1091 | 0.0000 | 5.5403E-5 |
| J | 2.1379 | -1.0114 | -0.4419 | 0.1459 | 0.0000 | -7.7813E-6 |

FIG.20

| | First embodiment | Second embodiment | Third embodiment | Fourth embodiment | Fifth embodiment |
|---|---|---|---|---|---|
| OL/EPD | 2.41 | 2.229 | 2.076 | 2.241 | 2.311 |
| EPD/SD32 | 0.274 | 0.301 | 0.325 | 0.306 | 0.301 |
| D12/D23 | 1.723 | 2.113 | 1.86 | 1.575 | 2.195 |
| TL/R1 | 2.866 | 2.831 | 2.728 | 3.151 | 2.631 |
| D12/f1 | 0.128 | 0.127 | 0.129 | 0.109 | 0.181 |
| Σ CT/f | 0.706 | 0.739 | 0.748 | 0.871 | 0.611 |
| (R2-R3)/(R4+R5) | -1.46 | -1.236 | -1.317 | -1.644 | -2.729 |
| FOV | 84 | 84 | 84 | 87 | 77.4 |
| f3/Vd3 | 0.241 | 0.32 | 0.415 | 0.603 | 0.962 |
| |SAG31|/CT3 | 0.552 | 0.46 | 0.489 | 0.544 | 0.37 |
| Vd1-Vd2 | 1.6 | 1.6 | 1.6 | 1.1 | 1.6 |
| |SAG31|+ |SAG22| | 0.512 | 0.679 | 0.805 | 0.805 | 0.628 |
| YC32/TL | 0.298 | 0.297 | 0.298 | 0.291 | 0.303 |
| Vd2-Vd3 | 25.6 | 25.6 | 33.2 | 33.7 | 31.7 |

FIG.21

IMAGING LENS ASSEMBLY

CROSS-REFERENCE TO RELATED APPLICATION

This application claims priority of Taiwanese Application No. 103133037, filed on Sep. 24, 2014.

FIELD

The disclosure relates to an imaging lens assembly.

BACKGROUND

An imaging lens set is generally adopted in a mobile phone, a smart phone, a tablet computer, a notebook computer or an imaging lens assembly. With the rapid development of technology, these electronic devices are designed to be increasingly thinner. Therefore, the imaging lens set for these electronic devices should be made correspondingly smaller as well. Moreover, the imaging lens set should be developed more wide-angle in order to increase a resolving power thereof, such as a resolution of 1920*1080 full HD (High Definition).

SUMMARY

Accordingly, a first aspect of an imaging lens assembly of the disclosure includes an optical lens set and a fixed aperture stop. The optical lens set includes first, second and third optical lens elements that are arranged sequentially from an object side to an image side along an optical axis of the imaging lens assembly. The first optical lens element has a positive refractive power near the optical axis, a convex object-side surface that faces the object side, and a concave image-side surface that faces the image side. The second optical lens element has a negative refractive power near the optical axis, and a convex image-side surface that faces the image side. At least one of an object-side surface and the image-side surface of the second optical lens element is aspheric. The third optical lens element has a refractive power near the optical axis, a convex object-side surface that faces the object side, and a concave image-side surface that faces the image side. At least one of the object-side surface and the image-side surface of the third optical lens element has an inflection point. The fixed aperture stop is disposed between the object side and the first optical lens element.

The imaging lens assembly of this aspect satisfies the following optical conditions:

$2.0 < OL/EPD < 2.5$, $Vd2 - Vd3 > 20$, $0.25 < EPD/SD32 < 0.35$, in which, OL represents a distance between the object-side surface of the first optical lens and the image-side surface of the third optical lens element along the optical axis, EPD represents an entrance pupil diameter of the imaging lens assembly, Vd2 represents the Abbe number of the second optical lens element, Vd3 represents the Abbe number of the third optical lens element, and SD32 represents a maximum clear aperture of the image-side surface of the third optical lens element.

A second aspect of the imaging lens assembly of the disclosure includes an optical lens set and a fixed aperture stop. The optical lens set includes first, second and third optical lens elements that are arranged sequentially from an object side to an image side along an optical axis of the imaging lens assembly. The first optical lens element has a positive refractive power near the optical axis, a convex object-side surface that faces the object side, and a concave image-side surface that faces the image side. The second optical lens element has a negative refractive power near the optical axis, and a convex image-side surface that faces the image side. At least one of an object-side surface and the image-side surface of the second optical lens element is aspheric, and at least one of the object-side surface and the image-side surface of the second optical lens element has an inflection point. The third optical lens element has a positive refractive power near the optical axis, a convex object-side surface that faces the object side, and a concave image-side surface that faces the image side. At least one of the object-side surface and the image-side surface of the third optical lens element has an inflection point.

The imaging lens assembly of this aspect satisfies the following optical conditions:

$2.0 < OL/EPD < 2.5$, $0 < f3/Vd3 > 1.5$, $0.3 < |SAG31|/CT3 < 0.6$, in which, OL represents a distance between the object-side surface of the first optical lens and the image-side surface of the third optical lens along the optical axis, EPD represents an entrance pupil diameter of said imaging lens assembly, f3 represents a focal length of said third optical lens element, Vd3 represents the Abbe number of said third optical lens element, |SAG31| represents a distance along the optical axis between a center of the object-side surface of said third optical lens element and a projection on the optical axis of a point of maximum clear aperture of said object-side surface of said third optical lens element, and CT3 represents a thickness of said third optical lens element along the optical axis.

BRIEF DESCRIPTION OF THE DRAWINGS

Other features and advantages of the disclosure will become apparent in the following detailed description of the embodiments with reference to the accompanying drawings, of which:

FIG. 3 shows a table of optical parameters for optical lens elements and a filter of the first embodiment;

FIG. 4 shows a table of parameters for aspheric surfaces of the first embodiment;

FIG. 7 shows a table of optical parameters for optical lens elements and a filter of the second embodiment;

FIG. 8 shows a table of parameters for aspheric surfaces of the second embodiment;

FIG. 11 shows a table of optical parameters for optical lens elements and a filter of the third embodiment;

FIG. 12 shows a table of parameters for aspheric surfaces of the third embodiment;

FIG. 15 shows a table of optical parameters for optical lens elements and a filter of the fourth embodiment;

FIG. 16 shows a table of parameters for aspheric surfaces of the fourth embodiment;

FIG. 19 shows a table of optical parameters for optical lens elements and a filter of the fifth embodiment;

FIG. 20 shows a table of parameters for aspheric surfaces of the fifth embodiment; and FIG. 21 shows a table of optical parameters for the first, second, third, fourth and fifth embodiments of the optical lens assembly according to the disclosure.

DETAILED DESCRIPTION

Figure 1:
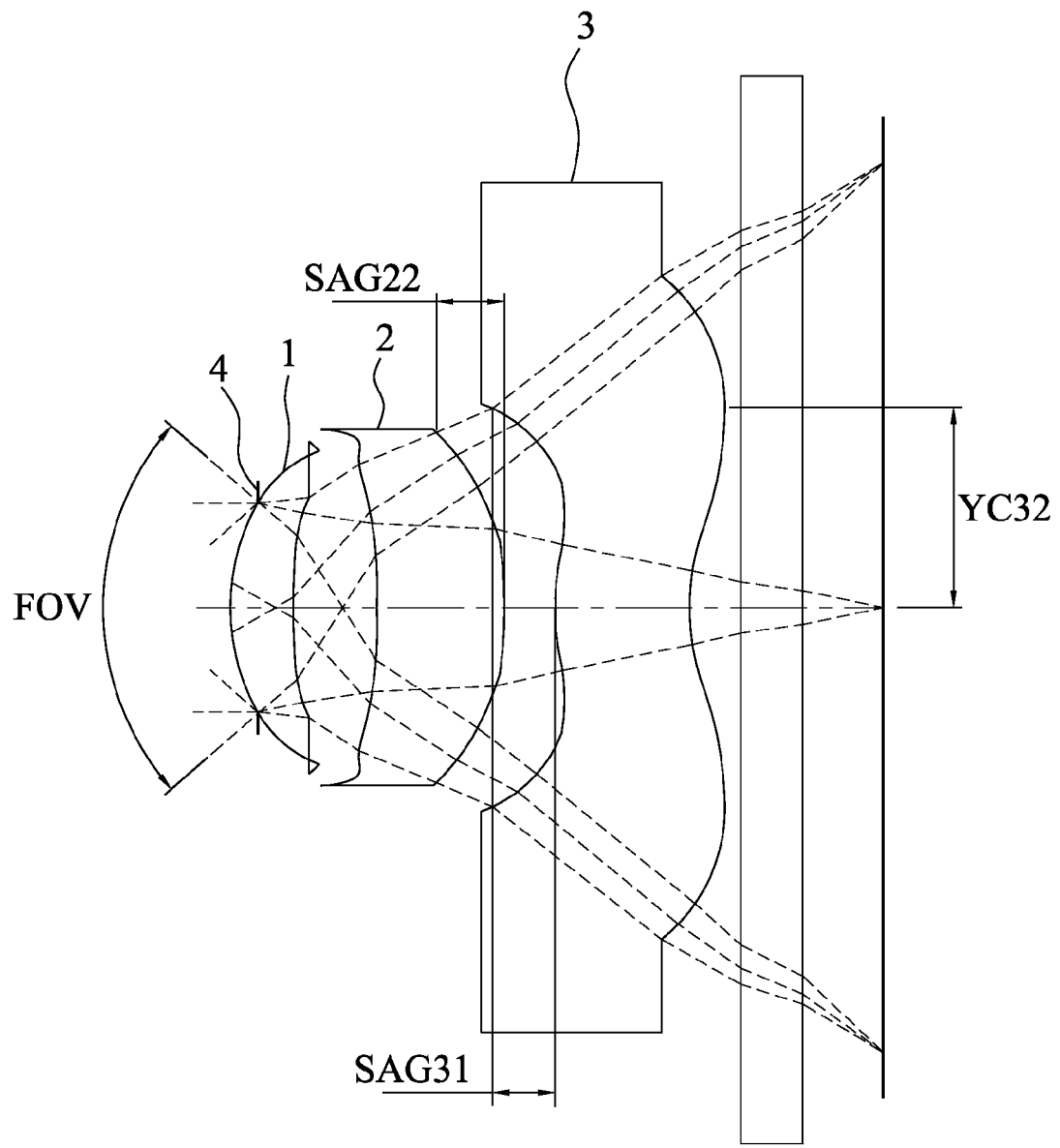
FIG. 1 is a schematic view of a first embodiment of an imaging lens assembly according to the disclosure.

Before the disclosure is described in greater detail, it should be noted that like elements are denoted by the same reference numerals throughout the disclosure.

Figure 2:
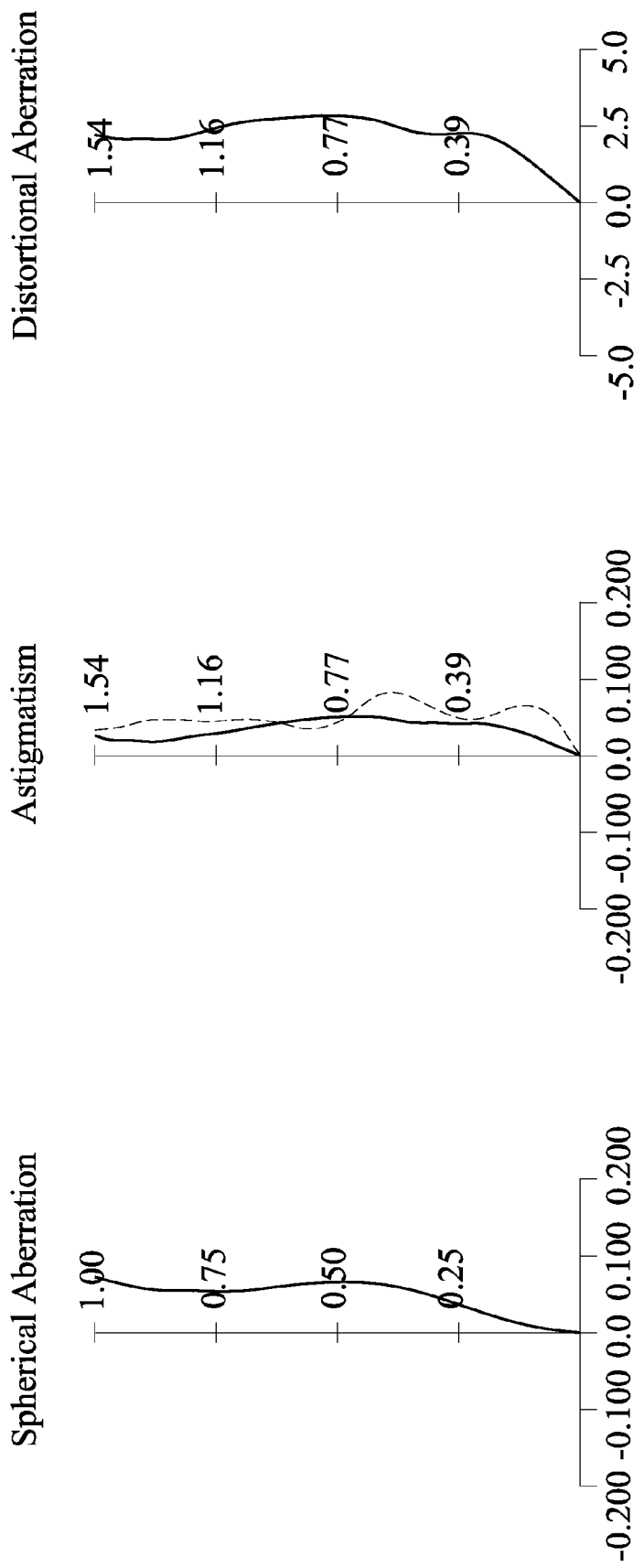
FIG. 2 shows simulation results of spherical aberration, astigmatism, and distortional aberration of the first embodiment.

Referring to FIGS. 1 to 4, an imaging lens assembly of the disclosure includes an optical lens set and a fixed aperture stop 4. The optical lens set includes first, second and third optical lens elements 1, 2, 3 that are arranged sequentially from an object side to an image side along an optical axis of the imaging lens assembly. The first optical lens element 1 has a positive refractive power near the optical axis, a convex object-side surface that faces the object side, and a concave image-side surface that faces the image side. The second optical lens element 2 has a negative refractive power near the optical axis, and a convex image-side surface that faces the image side. At least one of an object-side surface and the image-side surface of the second optical lens element 2 is aspheric, and at least one of the object-side surface and the image-side surface of the second optical lens element 2 has an inflection point. The third optical lens element 3 has a positive refractive power near the optical axis, a convex object-side surface that faces the object side, and a concave image-side surface that faces the image side. At least one of the object-side surface and the image-side surface of the third optical lens element 3 has an inflection point.

The fixed aperture stop 4 is disposed between the object side and the first optical lens element 1.

The imaging lens assembly of the disclosure satisfies the following optical conditions:

$2.0 < OL/EPD < 2.5$ (eq1);

$Vd2 - Vd3 > 20$ (eq2);

$0.25 < EPD/SD32 < 0.35$ (eq3);

$0.28 < YC32/TL < 0.31$ (eq4);

$0 < |Vd1 - Vd2| < 5$ (eq5);

$1.4 < D12/D23 < 2.4$ (eq6);

$2.2 < TL/R1 < 3.5$ (eq7);

$0.1 < D12/f1 < 0.2$ (eq8);

$0.5 < \Sigma CT/f < 1$ (eq9);

$-3.0 < (R2 - R3)/(R4 + R5) < -1.0$ (eq10);

$76 < FOV < 88$ (eq11);

$0 < f3/Vd3 < 1.5$ (eq12);

$0.3 < |SAG31|/CT3 < 0.6$ (eq13);

and $0.50 < |SAG22| + |SAG31| < 0.65$ (eq14), in which, OL represents a distance between the object-side surface of the first optical lens and the image-side surface of the third optical lens element along the optical axis, EPD represents an entrance pupil diameter of the imaging lens assembly, Vd2 represents the Abbe number of the second optical lens element 2, Vd3 represents the Abbe number of the third optical lens element 3, SD32 represents a maximum clear aperture of the image-side surface of the third optical lens element 3, YC32 represents a distance along a plane perpendicular to the optical axis between the optical axis and a point C on the image-side surface of the third optical lens element 3 to which the plane is tangential, where there is at least the point C on the image-side surface of the third optical lens element 3 to which the plane is tangential, TL represents a distance from an imaging plane to the object-side surface of the first optical lens element 1 along the optical axis, Vd1 represents the Abbe number of the first optical lens element 1, Vd2 represents the Abbe number of the second optical lens element 2, D12 represents a distance between the first and second optical lens elements 1,2 along the optical axis, D23 represents a distance between the second and third optical lens elements 2, 3 along the optical axis, R1 represents a radius of curvature of the object-side surface of the first optical lens element 1, f1 represents a focal length of the first optical lens element 1, $\Sigma CT$ represents a sum of thicknesses of the first, second and third optical lens elements 1, 2, 3 along the optical axis, f represents a focal length of the imaging lens assembly, R2 represents a radius of curvature of the image-side surface of the first optical lens element 1, R3 represents a radius of curvature of the object-side surface of the second optical lens element 2, R4 represents a radius of curvature of the image-side surface of the second optical lens element 2, R5 represents a radius of curvature of the object-side surface of the third optical lens element 3, FOV represents a maximum field-of-view of the imaging lens assembly, f3 represents a focal length of the third optical lens element 3, |SAG31| represents a distance along the optical axis between a center of the object-side surface of the third optical lens element 3 and a projection on the optical axis of a point of maximum clear aperture of the object-side surface of the third optical lens element 3, CT3 represents a thickness of the third optical lens element 3 along the optical axis, and |SAG22| represents a distance along the optical axis between a center of the image-side surface of the second optical lens element 2 and a projection on the optical axis of a point of maximum clear aperture of the image-side surface of the second optical lens element 2. The first, second and third optical lens elements 1, 2, 3 are made of plastic materials.

A more detailed specification of the first embodiment of the imaging lens assembly according to the disclosure is as follows: OL=1.604 mm, EPD=0.666 mm, f3=7.239 mm, Vd1=57.2, Vd2=55.6, Vd3=30, SD32=2.433 mm, R1=0.796 mm, R2=2.236 mm, R3=−4.456 mm, R4=−5.270 mm, R5=0.686 mm, ΣCT=1.143 mm, f=1.619 mm, f1=2.278 mm, D12=0.292 mm, D23=0.170 mm, TL=2.28, YC32=0.679 mm, FOV=84.0, |SAG31|=0.262 mm, |SAG22|=0.25 mm, CT3=0.474 mm.

In the first embodiment, the object-side and image-side surfaces of the first, second and third optical lens elements 1, 2, 3 are all aspheric surfaces. An aspheric surface of the present disclosure satisfies the following equation:

$$z = \frac{ch^2}{1+[1-(k+1)c^2h^2]^{0.5}} + Ah^4 + Bh^6 + Ch^8 + Dh^{10} + Eh^{12} + Fh^{14} + Gh^{16} + Hh^{18} + Jh^{20} + \ldots, \quad \text{(eq 15)}$$

in which, z is the z-component of the displacement of the aspheric surface from the vertex of the aspheric surface along the optical axis, at a distance h from the optical axis; k is a conic constant; c is the reciprocal of a radius of curvature; and A, B, C, E, F, G, H and J, etc. are aspheric coefficients. The aspheric surface may correct aberrations and decrease tolerance sensitivity, and may also contribute to the wider viewing angle of the imaging lens assembly.

Referring further to FIG. 21, the parameters of the first embodiment of the imaging lens assembly are shown to satisfy Equations 1 to 14 (eq1 to eq14).

Figure 5:
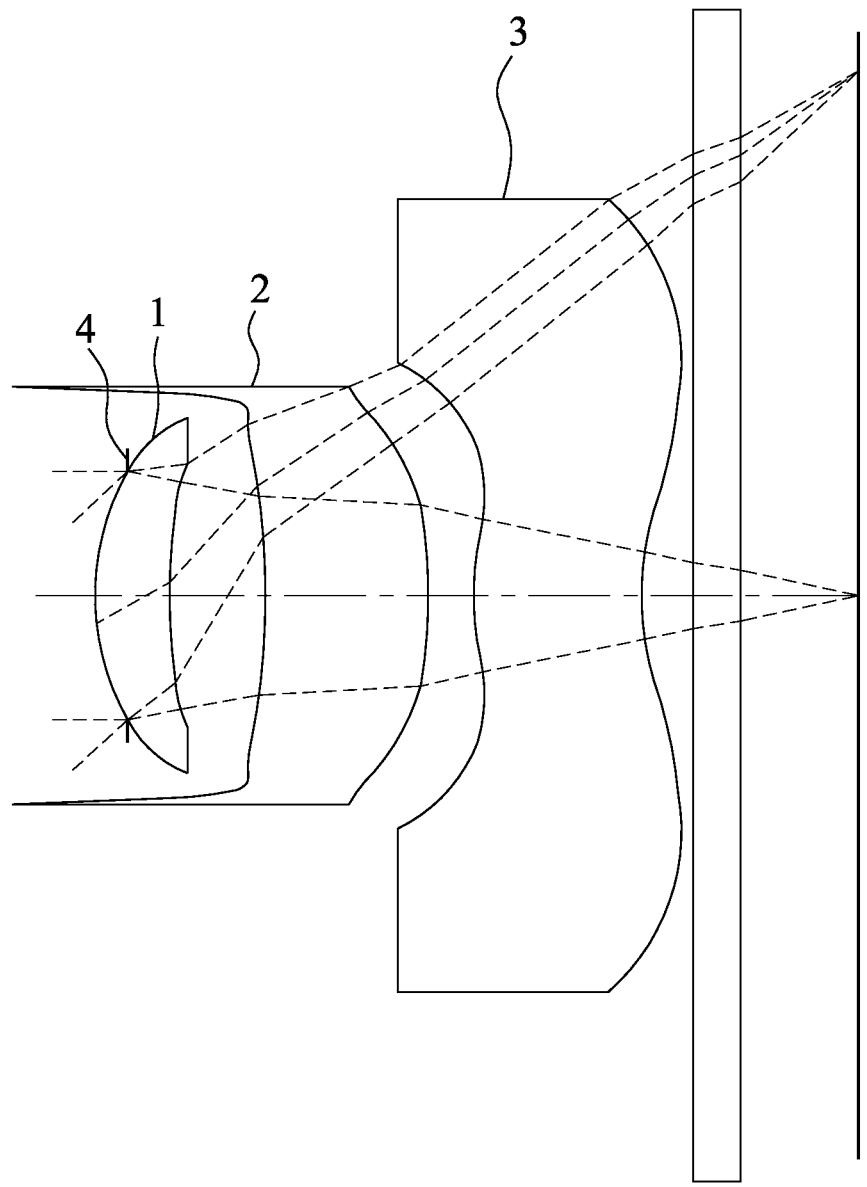
FIG. 5 is a schematic view of a second embodiment of the imaging lens assembly according to the disclosure.
Figure 6:
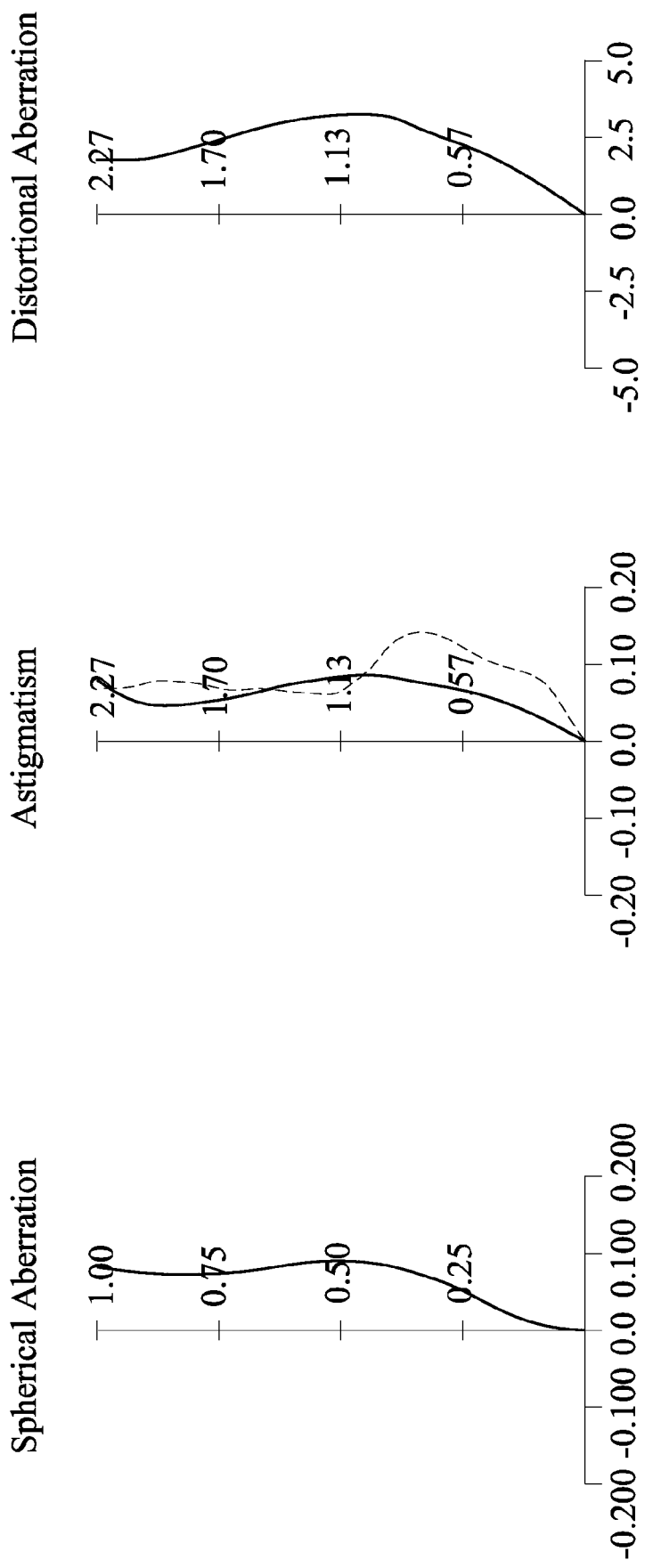
FIG. 6 shows simulation results of spherical aberration, astigmatism, and distortional aberration of the second embodiment.

Referring to FIGS. 5 to 8, a more detailed specification of a second embodiment of the imaging lens assembly according to the disclosure is as follows: OL=2.396 mm, EPD=1.075 mm, f3=9.587 mm, Vd1=57.2, Vd2=55.6, Vd3=30, SD32=3.566 mm, R1=1.184 mm, R2=3.545 mm, R3=−6.111 mm, R4=−8.889 mm, R5=1.075 mm, ΣCT=1.779 mm, f=2.408 mm, f1=3.290 mm, D12=0.419 mm, D23=0.198 mm, TL=3.353, YC32=0.997 mm, FOV=84.0, |SAG31|=0.337 mm, |SAG22|=0.341 mm, CT3=0.733 mm.

Referring further to FIG. 21, the parameters of the second embodiment of the imaging lens assembly are shown to satisfy Equations 1 to 14 (eq1 to eq14).

Figure 9:
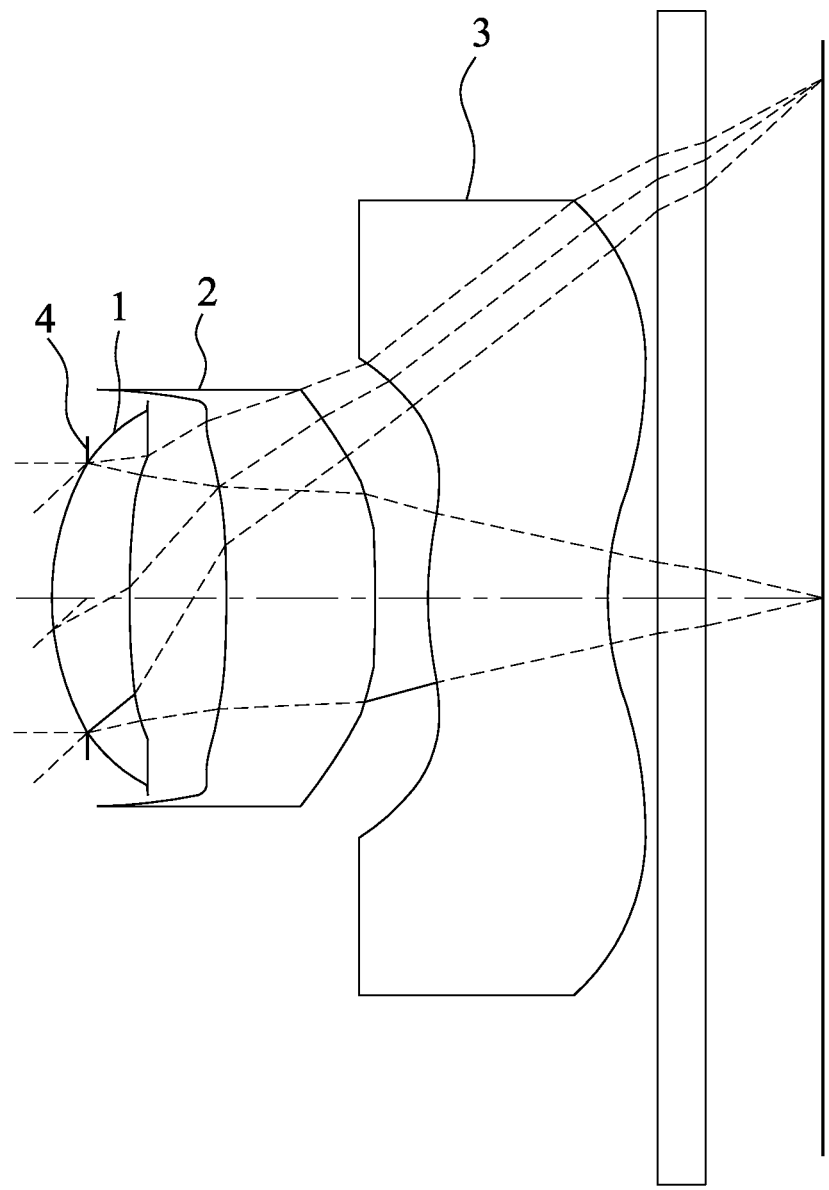
FIG. 9 is a schematic view of a third embodiment of the imaging lens assembly according to the disclosure.
Figure 10:
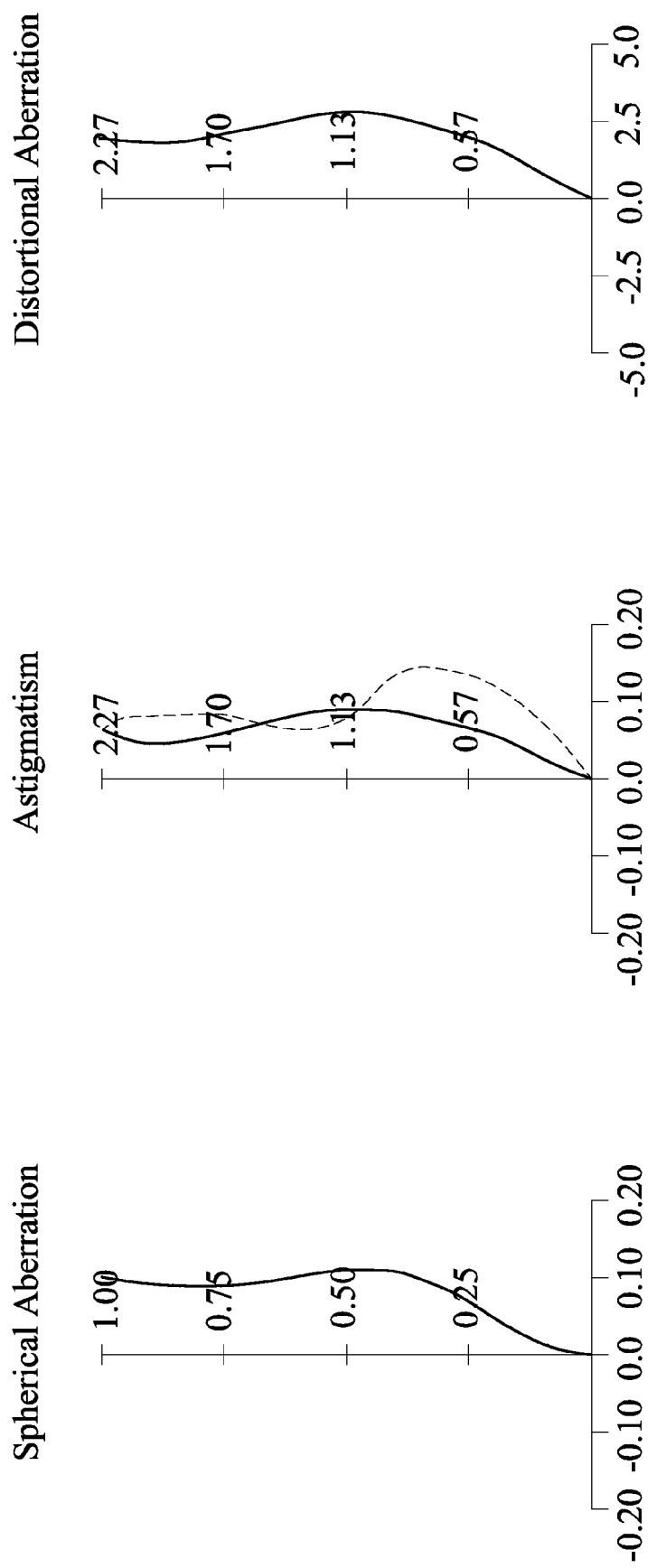
FIG. 10 shows simulation results of spherical aberration, astigmatism, and distortional aberration of the third embodiment.

Referring to FIGS. 9 to 12, a more detailed specification of a third embodiment of the imaging lens assembly according to the disclosure is as follows: OL=2.447 mm, EPD=1.178 mm, f3=9.292 mm, Vd1=57.2, Vd2=55.6, Vd3=22.4, SD32=3.620 mm, R1=1.244 mm, R2=4.114 mm, R3=−6.189 mm, R4=−9.014 mm, R5=1.189 mm, ΣCT=1.791 mm, f=2.393 mm, f1=3.319 mm, D12=0.427 mm, D23=0.229 mm, TL=3.393, YC32=1.011 mm, FOV=84.0, |SAG31|=0.385 mm, |SAG22|=0.420 mm, CT3=0.788 mm.

Referring further to FIG. 21, the parameters of the third embodiment of the imaging lens assembly are shown to satisfy Equations 1 to 14 (eq1 to eq14).

Figure 13:
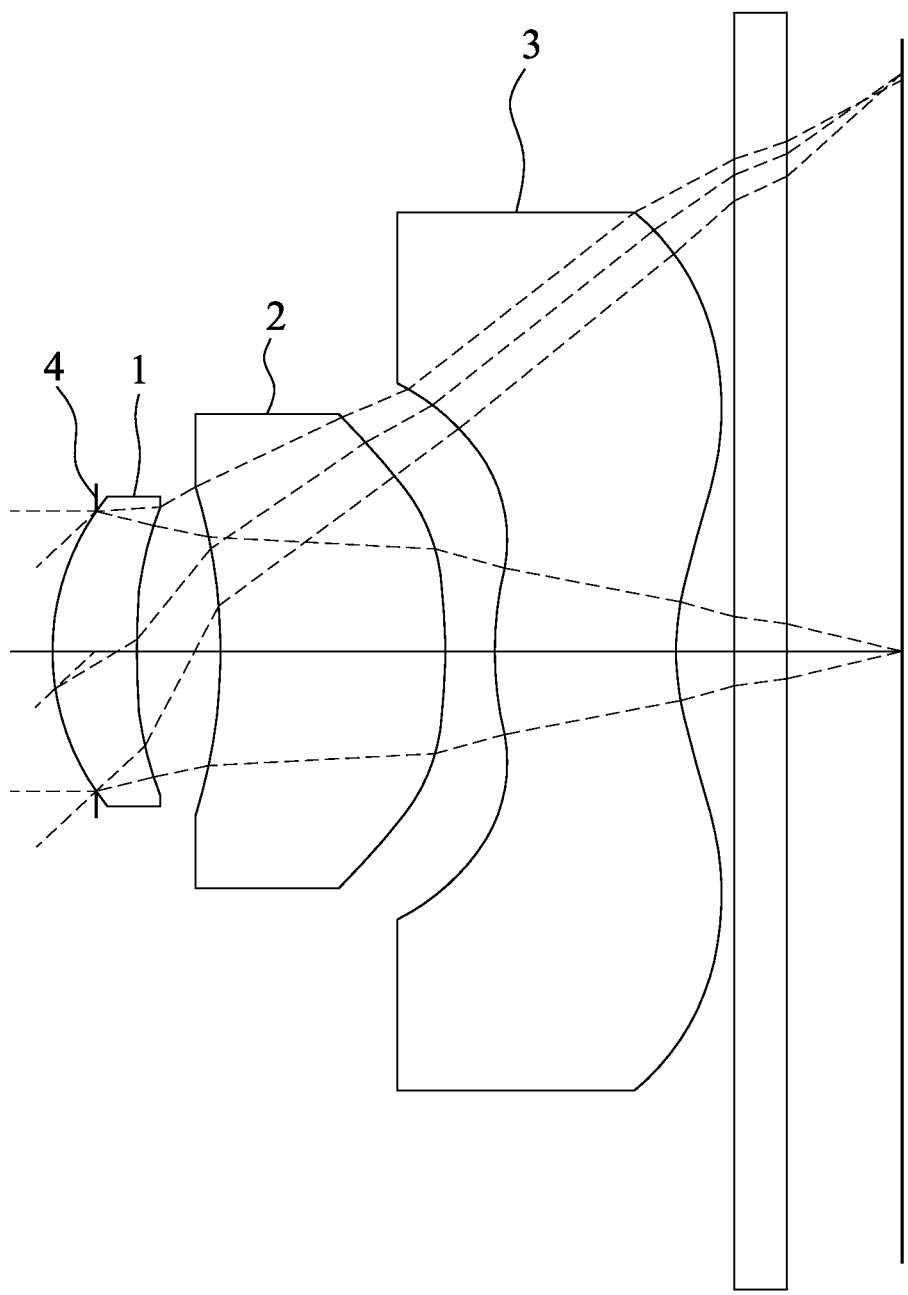
FIG. 13 is a schematic view of a fourth embodiment of the imaging lens assembly according to the disclosure.
Figure 14:
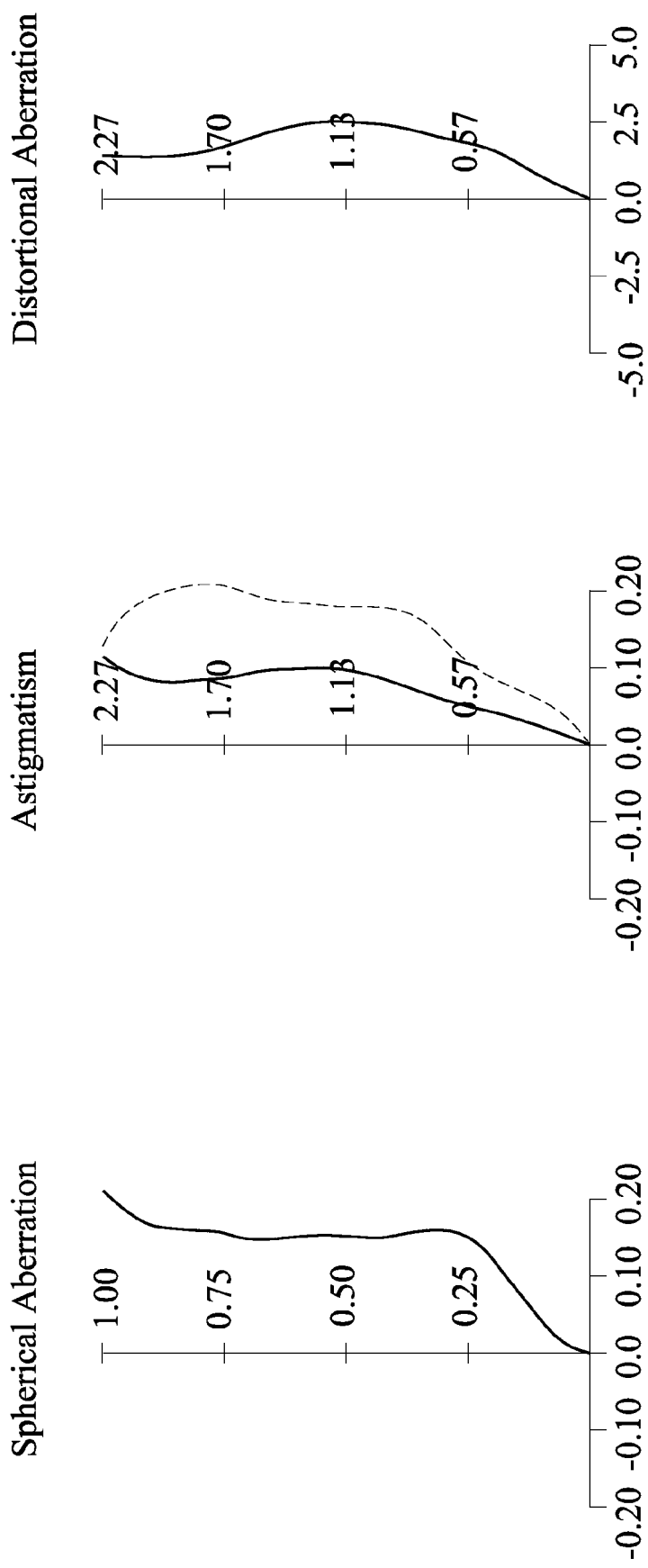
FIG. 14 shows simulation results of spherical aberration, astigmatism, and distortional aberration of the fourth embodiment.

Referring to FIGS. 13 to 16, a more detailed specification of a fourth embodiment of the imaging lens assembly according to the disclosure is as follows: OL=2.457 mm, EPD=1.097 mm, f3=13.518 mm, Vd1=57.2, Vd2=56.1, Vd3=22.4, SD32=3.582 mm, R1=1.062 mm, R2=3.208 mm, R3=−5.012 mm, R4=−6.105 mm, R5=1.105 mm, ΣCT=1.939 mm, f=2.227 mm, f1=2.917 mm, D12=0.317 mm, D23=0.201 mm, TL=3.350 mm, YC32=0.976 mm, FOV=87.0, |SAG31|=0.385 mm, |SAG22|=0.420 mm, CT3=0.709 mm.

Referring further to FIG. 21, the parameters of the fourth embodiment of the imaging lens assembly are shown to satisfy Equations 1 to 14 (eq1 to eq14).

Figure 17:
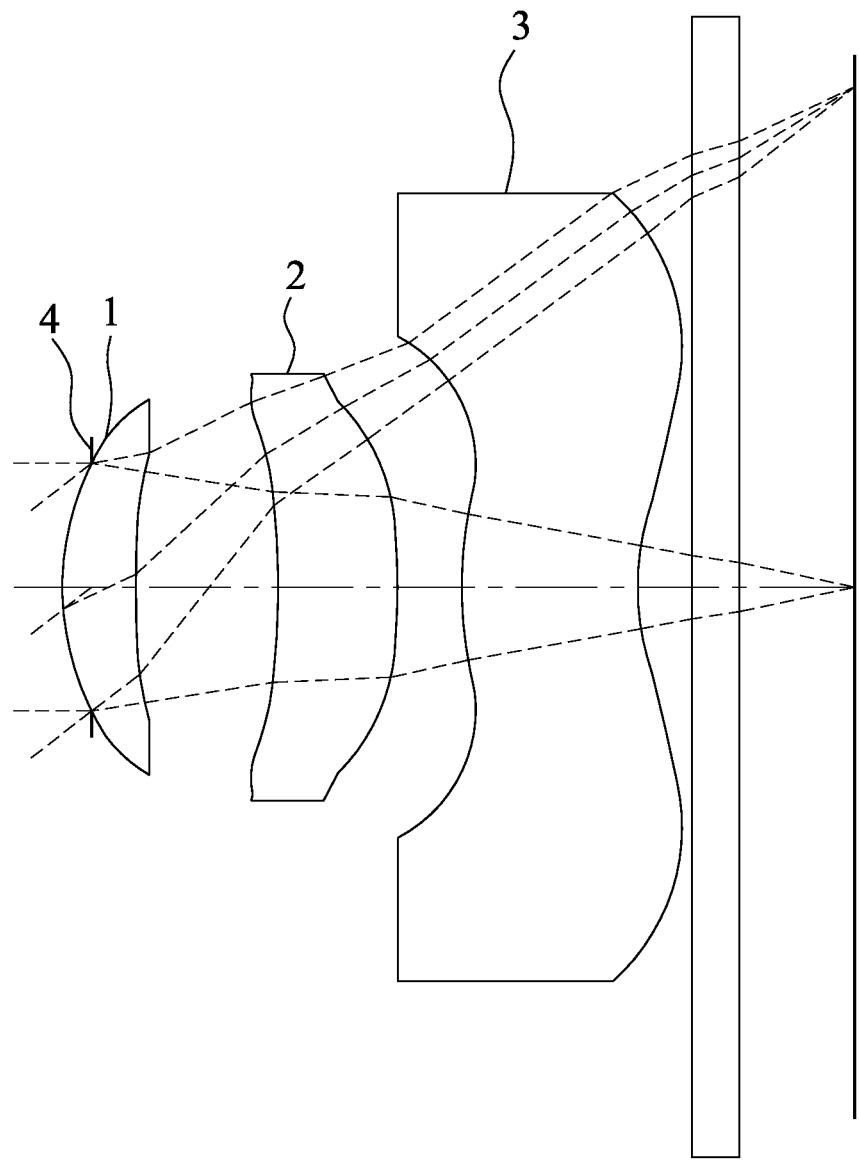
FIG. 17 is a schematic view of a fifth embodiment of the imaging lens assembly according to the disclosure.
Figure 18:
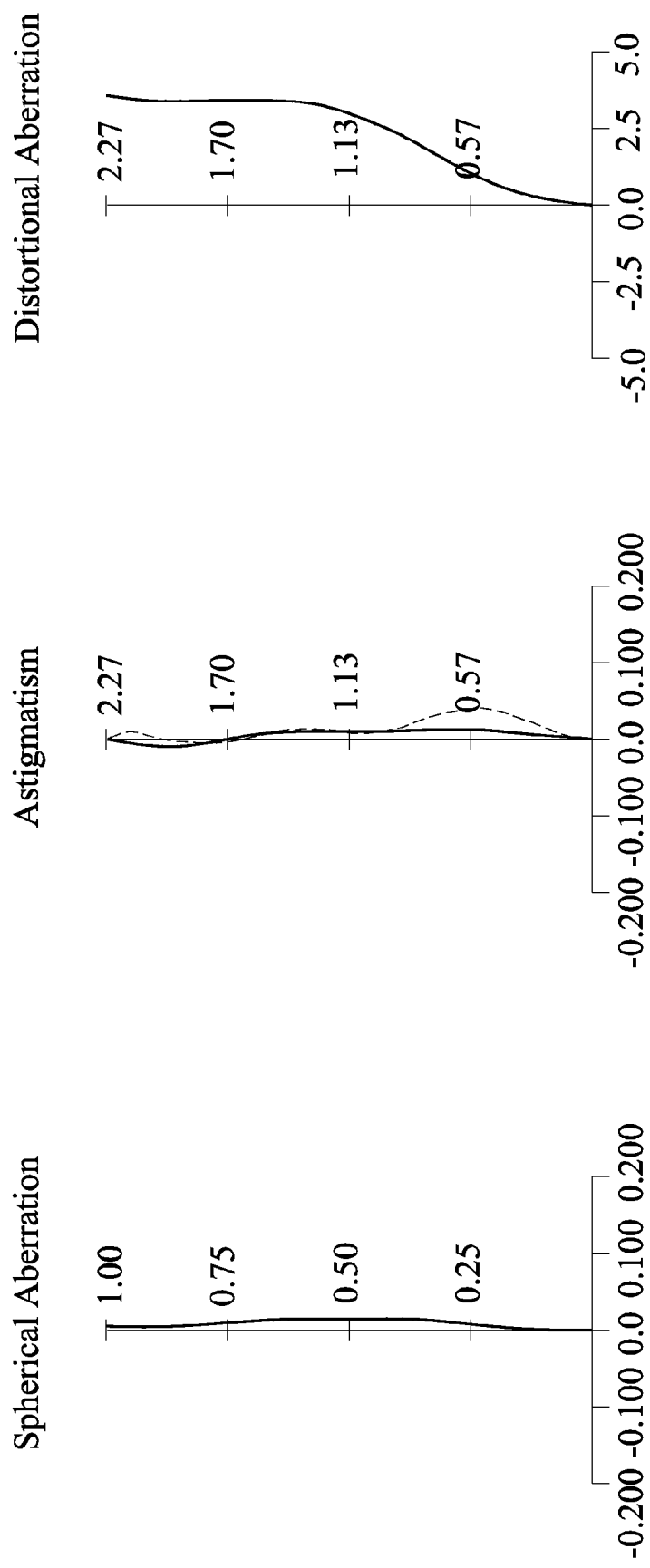
FIG. 18 shows simulation results of spherical aberration, astigmatism, and distortional aberration of the fifth embodiment.

Referring to FIGS. 17 to 20, a more detailed specification of a fifth embodiment of the imaging lens assembly according to the disclosure is as follows: OL=2.597 mm, EPD=1.124 mm, f3=22.994 mm, Vd1=57.2, Vd2=55.6, Vd3=23.9, SD32=3.735 mm, R1=1.357 mm, R2=4.762 mm, R3=−4.592 mm, R4=−4.781 mm, R5=1.353 mm, ΣCT=1.661 mm, f=2.716 mm, f1=3.558 mm, D12=0.643 mm, D23=0.293 mm, TL=3.57 mm, YC32=1.082 mm, FOV=77.4, |SAG31|=0.293 mm, |SAG22|=0.335 mm, CT3=0.792 mm.

Referring further to FIG. 21, the parameters of the fifth embodiment of the imaging lens assembly are shown to satisfy Equations 1 to 14 (eq1 to eq14).

In sum, the imaging lens assembly of the disclosure satisfies Equations 1 to 14, thereby increasing a resolving power thereof, enlarging a maximum viewing angle thereof, and decreasing the overall thickness thereof.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. An imaging lens assembly, comprising:
   an optical lens set including first, second and third optical lens elements that are arranged sequentially from an object side to an image side along an optical axis of said imaging lens assembly,
   said first optical lens element having a positive refractive power near the optical axis, said first optical lens element having a convex object-side surface that faces the object side, and a concave image-side surface that faces the image side,
   said second optical lens element having a negative refractive power near the optical axis, said second optical lens element having a convex image-side surface that faces the image side, wherein at least one of an object-side surface and said image-side surface of said second optical lens element is aspheric,
   said third optical lens element having a refractive power near the optical axis, said third optical lens element having a convex object-side surface that faces the object side, and a concave image-side surface that faces the image side, wherein at least one of said object-side surface and said image-side surface of said third optical lens element has an inflection point; and
   a fixed aperture stop disposed between the object side and said first optical lens element;
   wherein said imaging lens assembly satisfies the following optical conditions:

$2.0 < OL/EPD < 2.5,$ $Vd2 - Vd3 > 20,$ $0.25 < EPD/SD32 < 0.35,$ in which, OL represents a distance between said object-side surface of said first optical lens and said image-side surface of said third optical lens element along the optical axis, EPD represents an entrance pupil diameter of said imaging lens assembly, Vd2 represents the Abbe number of said second optical lens element, Vd3 represents the Abbe number of said third optical lens element, and SD32 represents a maximum clear aperture of said image-side surface of said third optical lens element.

2. The imaging lens assembly as claimed in claim 1, further satisfying the following optical condition:

$0.28<YC32/TL<0.31$, in which, YC32 represents a distance along a plane perpendicular to the optical axis between the optical axis and a point on said image-side surface of said third optical lens element to which the plane is tangential, where there is at least the point on said image-side surface of said third optical lens element to which the plane is tangential, and TL represents a distance from an imaging plane to said object-side surface of said first optical lens element along the optical axis.

3. The imaging lens assembly as claimed in claim 1, further satisfying the following optical condition:

$0<|Vd1-Vd2|<5$, in which, Vd1 represents the Abbe number of said first optical lens element, and Vd2 represents the Abbe number of said second optical lens element.

4. The imaging lens assembly as claimed in claim 1, further satisfying the following optical condition:

$1.4<D12/D23<2.4$, in which, D12 represents a distance between said first and second optical lens elements along the optical axis, and D23 represents a distance between said second and third optical lens elements along the optical axis.

5. The imaging lens assembly as claimed in claim 1, further satisfying the following optical condition:

$2.2<TL/R1<3.5$, in which, TL represents a distance from an imaging plane to said object-side surface of said first optical lens element along the optical axis, and R1 represents a radius of curvature of said object-side surface of said first optical lens element.

6. The imaging lens assembly as claimed in claim 1, further satisfying the following optical condition:

$0.1<D12/f1<0.2$, in which, D12 represents a distance between said first and second optical lens elements along the optical axis, and f1 represents a focal length of said first optical lens element.

7. The imaging lens assembly as claimed in claim 1, further satisfying the following optical condition:

$0.5<\Sigma CT/f<1$, in which, $\Sigma CT$ represents a sum of thicknesses of said first, second and third optical lens elements along the optical axis, and f represents a focal length of said imaging lens assembly.

8. The imaging lens assembly as claimed in claim 1, further satisfying the following optical condition:

$-3.0<(R2-R3)/(R4+R5)<-1.0$, in which, R2 represents a radius of curvature of said image-side surface of said first optical lens element, R3 represents a radius of curvature of said object-side surface of said second optical lens element, R4 represents a radius of curvature of said image-side surface of said second optical lens element, and R5 represents a radius of curvature of said object-side surface of said third optical lens element.

9. The imaging lens assembly as claimed in claim 1, wherein said third optical lens element has positive refractive power near the optical axis.

10. The imaging lens assembly as claimed in claim 1, further satisfying the following optical condition:

$76<FOV<88$, in which, FOV represents a maximum field-of-view of said imaging lens assembly.

11. The imaging lens assembly as claimed in claim 1, wherein said first, second and third optical lens elements are made of plastic materials.

* * * * *